United States Patent [19]

Matheny, III et al.

[11] 4,244,448

[45] Jan. 13, 1981

[54] ARTICLE CONSOLIDATION SYSTEM

[75] Inventors: William F. Matheny, III; Clay Bernard, II; William M. Angell, all of Tulsa, Okla.

[73] Assignee: Clay Bernard Systems International Ltd., Tulsa, Okla.

[21] Appl. No.: 923,653

[22] Filed: Jul. 11, 1978

[51] Int. Cl.³ .............................................. B65G 15/12
[52] U.S. Cl. ...................................................... 186/55
[58] Field of Search ................. 186/1 AE, 1 J, 1 AK, 186/1 AS, 1 AL, 1 AR, 1 AW; 221/5, 13, 77–79; 194/10

[56] References Cited

U.S. PATENT DOCUMENTS

| | | | |
|---|---|---|---|
| 2,672,289 | 3/1954 | Skillman | 186/1 J |
| 2,875,878 | 3/1959 | Hoban | 194/10 |
| 3,147,838 | 9/1964 | Mueller et al. | 194/10 |

Primary Examiner—Stanley H. Tollberg
Attorney, Agent, or Firm—William S. Dorman

[57] ABSTRACT

A consolidation system for articles including a continuous track with a continuous chain supported from the track and movable in a horizontal direction around the track. Horizontally spaced and vertically extending baskets are suspended from the chain with each basket having vertically spaced compartments. A drive mechanism is provided for driving the chain around the track. An operator work station is located at a fixed position on the outside of the track. A conveyor is provided to move the articles adjacent the work station and pans are provided to deliver preselected articles from the conveyor to the operator work station. The chain can be moved a predetermined degree to align a preselected basket with the work station. A predetermined vertical compartment on the preselected basket can be indicated at the work station for introducing articles into the predetermined vertical compartment and a predetermined vertical compartment of the preselected basket can also be indicated at the work station for removing the combination of articles therein. An outgoing conveyor moves combinations of articles from the work station.

4 Claims, 6 Drawing Figures

ARTICLE CONSOLIDATION SYSTEM

CROSS REFERENCE TO RELATED APPLICATIONS

This invention relates in part to the invention described in pending application Bernard, Metheny, and Angell, CAROUSEL AUTOMATIC STORAGE AND RETRIEVAL SYSTEM, Ser. No. 910,453.

BACKGROUND OF THE INVENTION

1. Field of the Invention

This invention relates to an apparatus for consolidation of small parts and the like. More particularly, this invention relates to an apparatus for consolidation of small parts and the like that is simple in operation and controlled from a computer terminal.

2. Description of the Prior Art

Consolidation systems for small parts and the like are used to assemble orders in wholesale and retail applications and may be used to assemble kits in manufacturing applications. Conventional consolidation systems utilize solid storage shelves whereby an assembler or human operator must go to the shelf to pick the desired inventory items.

At that point, it is a principal object and purpose of the invention to provide a system whereby the desired inventory items are brought to the assembler or human operator as opposed to having solid shelves whereby the operator must go to the shelf. The amount of operator travel that is necessary would be reduced.

It is a further object and purpose of the present invention to provide an improved inventory control system through use of a computer memory to retain records of inventory in the system.

SUMMARY OF THE INVENTION

The present invention is a system for consolidation of parts and the like to be used in the preparation of orders or kits. The consolidation system includes a sequencer carousel controlled by a sequencer controller terminal. The carousel contains a continuous oval-like track which has a continuous chain throughout the length. Compartmented baskets are suspended from the chain which is moved around the track by a drive sprocket. The baskets are parallel to each other and would be lightweight in construction. Tote bins would rest in the various compartment levels of the baskets.

The drive sprocket is connected to a motor through a gear reducer. The motor is also connected to a pulse generator which includes a circular disc or plate to which a series of magnets are formed. When the disc is rotated by operation of the motor the magnets pass magnetic sensors located at a fixed point. The sensors are linked to interface circuitry which deciphers the magnetic pulses from the generator. The interface circuitry is connected to the sequencer controller terminal.

The sequencer controller terminal is linked to a host computer which retains records of inventory within the system. Upon demand, the host computer would control operation of a pan conveyor which would pass the controller terminal. Parts would travel on the pan conveyor past the terminal where information on the parts would be entered into the terminal. A part or parts would slide from the pan conveyor down an inclined chute.

The desired bin would then be at a work station within reach of the human operator. The sequencer controller would simultaneously be directing the movement of the carousel and compartmented baskets. The appropriate basket would be aligned adjacent the operator which is accomplished through use of digital positioning on the carousel.

The desired compartment level on a desired basket would be indicated by a lightpost linked to the controller terminal and located adjacent to the work station. A shipping label printer located at the work station is also linked to the controller terminal.

Once the orders or kits have been assembled, the operator will place an order on inclined rollers which are connected to an outgoing conveyor.

DETAILED DESCRIPTION OF THE PREFERRED EMBODIMENTS

Figure 1:
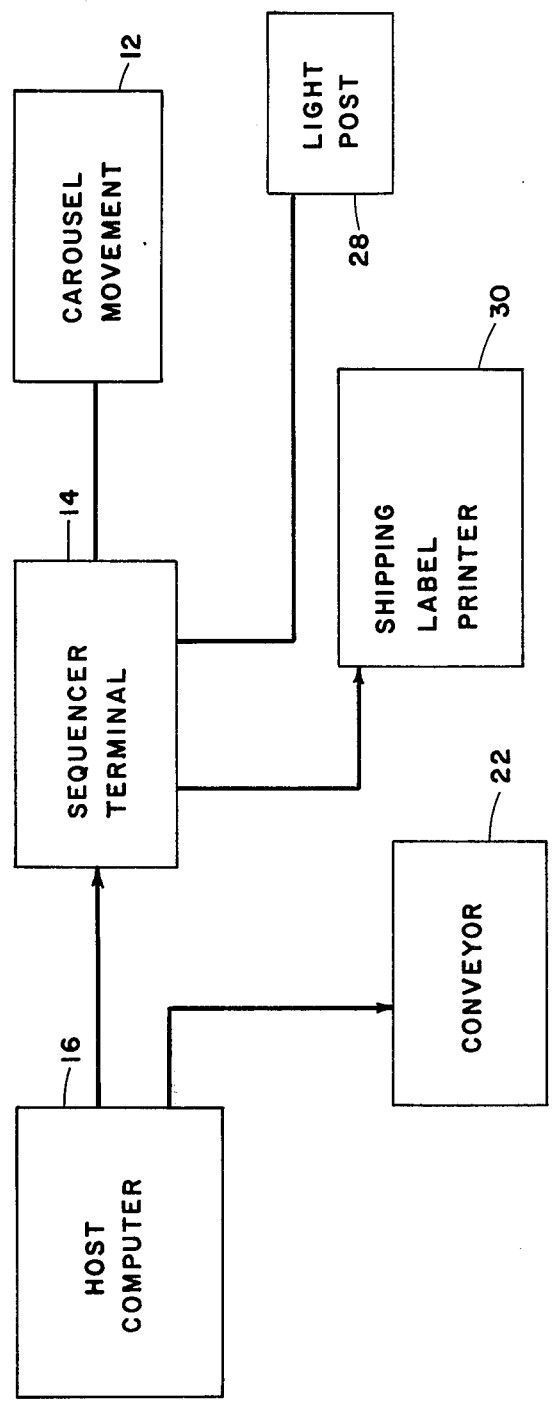
FIG. 1 is a flow-chart diagram of the operation of a consolidation system constructed in accordance with one embodiment of the present invention.

Referring to the drawings in detail, FIGS. 1 through 6 show a system 10 for consolidation of parts and the like. The system 10 would be utilized for a multitude of different articles, such as car parts, aircraft parts and computer parts and could be used in retail, wholesale, and manufacturing applications. The system would consolidate parts for orders or would consolidate parts for kits.

The consolidation system includes a sequencer carousel 12 to be used for article storage with related computer controls as best seen in the flow-chart in FIG. 1. A sequencer controller terminal 14 is linked electronically to a host computer 16 which retains records or files 18 of inventory in the system and can be linked to other sequencer controller terminals. The controller terminal might have digital controls and would be programmed by a terminal operator (not shown). The actual operation of such a computer controller terminal is well-known in computer art.

Upon command, the host computer would control operation of a pan conveyor 22 which would pass adjacent the controller terminal 14. As will be seen, the sequencer controller would direct the movement of the carousel 12 and compartmented baskets 24 suspended therefrom. The desired compartment level 26 on a desired basket would be indicated by a lightpost 28 having a series of individual lights linked to the controller terminal 14 and located adjacent to the carousel 12. A shipping label printer 30 located adjacent to the carousel is also linked to the controller terminal.

If more than one sequencer carousel were used, the host computer 16 would control operation of the pan conveyor to direct parts to desired carousels. The host computer would service each sequencer carousel in the system.

Figure 2:
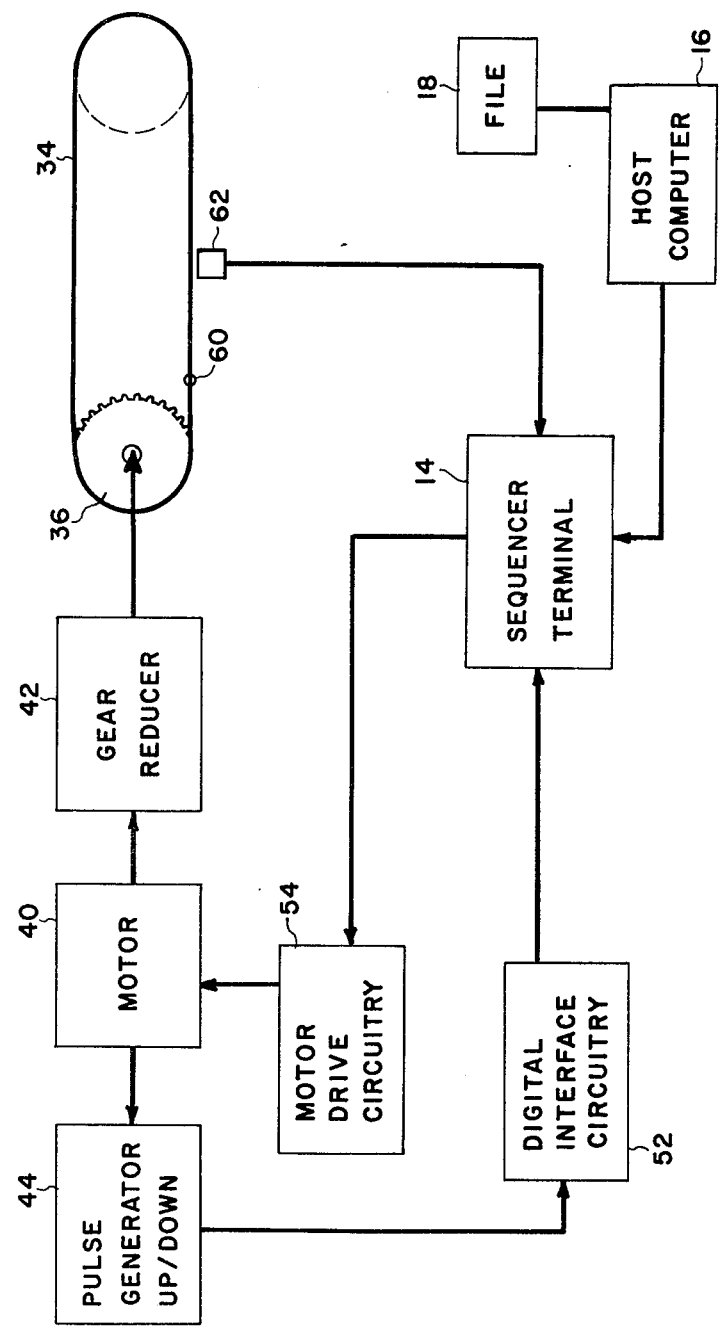
FIG. 2 is a flow-chart diagram of the operation of a carousel that would be a part of the consolidation system shown in FIG. 1.

The operation of the sequencer carousel 12 is best shown in the flow-chart diagram in FIG. 2. The carousel contains a continuous oval-like track 32 which has a continuous chain 34 throughout the length of the track. The compartmented baskets 24 are suspended from the chain which is moved around the track by a drive sprocket 36. The baskets are parallel to each other and would be lightweight in construction, consisting of wire caging for instance. Tote bins 38 would rest in the various compartment levels of the baskets 24.

Figure 3:
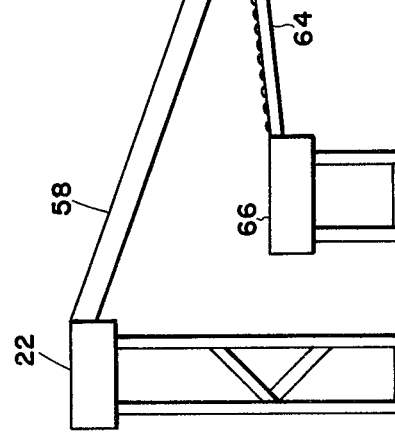
FIG. 3 is a top view of a pulse generator that would be used in the operation of the carousel shown in FIG. 2.

The drive sprocket 36 is connected to a motor 40 through a gear reducer 42. The motor is connected to a pulse generator 44, the operation of which is best seen in FIG. 3. The pulse generator includes a circular disc or plate 46 to which a series of magnets 48 are formed. When the disc is rotated by operation of the motor 40, the magnets successively pass magnetic sensors 50 located at a fixed point which are capable of detecting magnetic flux (now shown). Returning to a consideration of FIG. 2, the sensors are linked to interface circuitry 52 which deciphers the magnetic pulses from the generator 44. The interface circuitry 52 is connected to the sequencer controller 14. The sequencer controller is directly linked to the motor 40 through motor drive circuitry 54.

Figure 5:
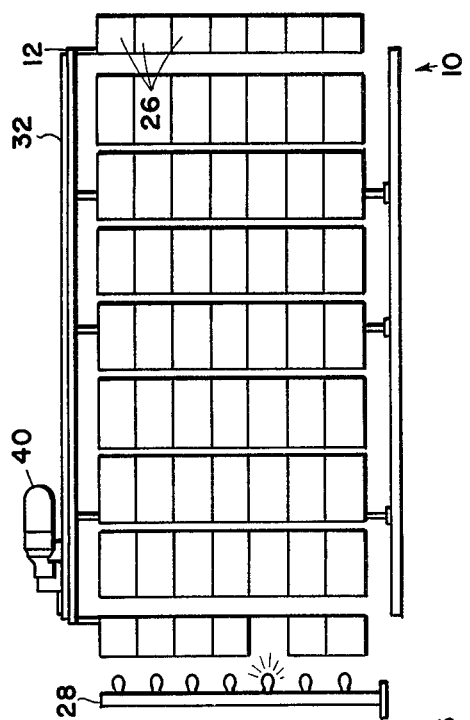
FIG. 5 is a side view of the consolidation system shown in FIG. 1.
Figure 5:
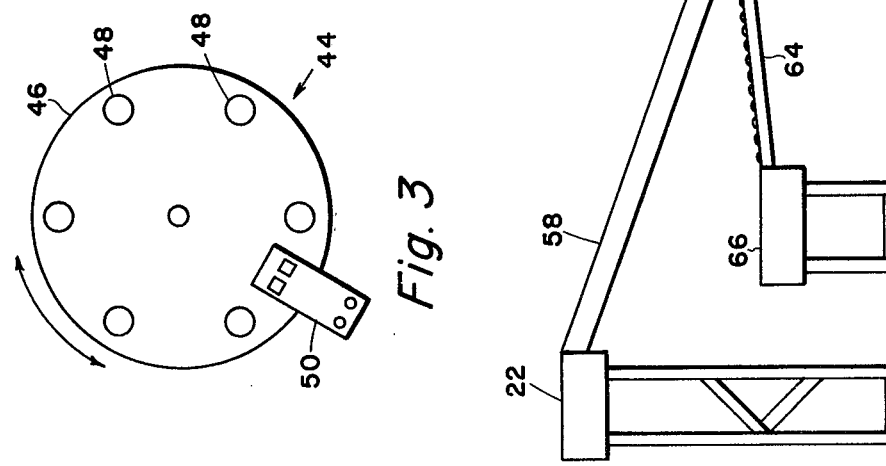
Figure 4:
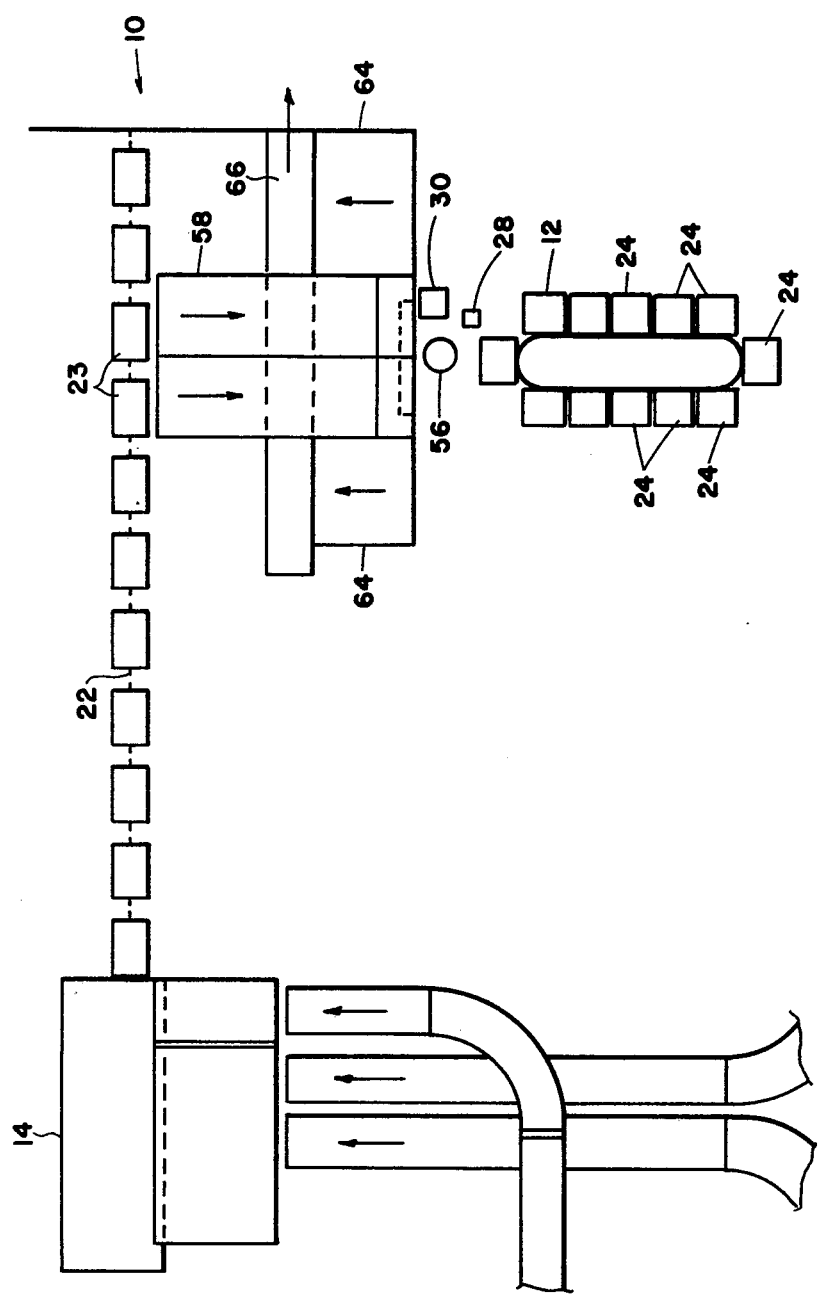
FIG. 4 is a diagrammatic view of the consolidation system shown in FIG. 1.

The operation of a typical article consolidation system is shown diagrammatically in FIG. 4. A human operator 56 (indicated by a circle in FIG. 4) stationed at a generally fixed position so that minimal operator movement is necessary. Parts (now shown) would travel on the pan conveyor 22 past the controller terminal 14 where information on the parts would be entered into the terminal by the terminal operator. The pan conveyor consists of a series of individual pans 23, each being a measured distance apart. From a fixed point, the controller terminal would direct the desired part or parts to travel a measured distance on the pan conveyor 22 and then slide from the pan conveyor. The desired part or parts would drop from the pan conveyor and slide down an inclined chute 58, as best seen in FIG. 5 to location adjacent the human operator 56. The pan conveyor and the inclined chute 58 comprise a means to selectively deliver preselected articles to the human operator.

At this point, the desired part or parts would be at the work station within reach of the human operator 56. The operator would be stationed at a point that is also within reaching distance of the outside of the sequencer carousel 12. The part or parts would be taken by the operator 56 and placed in the appropriate compartment on the appropriate basket. The appropriate compartment will be indicated by the individual lights on the lightpost 28. It is important to note that minimal movement by the human operator 56 is necessary.

While the parts are being brought by the pan conveyor 22 to the human operator, the sequencer controller 14 would also be automatically directing the appropriate basket to align and stop adjacent the operator 56. This is accomplished through use of digital positioning on the carousel 12. Returning to a consideration of FIG. 2, at a reference point on the chain 34, a home basket emitter 60 is formed. At a fixed position adjacent the chain 34 a sensor 62 is located which is linked to the sequencer controller 14. Calculating the number of pulses emitted from the time the sensor first detects pulses until the time the sensor again detects pulses in one complete revolution, the total number of pulses in a revolution can be determined. The controller can utilize the home basket emitter to align a desired basket adjacent the human operator by allowing the baskets to move a predetermined amount.

It is important to note that the baskets moved by the chain 34 can be made to move in either direction.

Once the orders or kits have been consolidated by bringing all the desired parts together, the order or kit is ready to be sent from the consolidation system 10. The label printer 30 will deliver a receipt or ticket (not shown) to the human operator 56 who will place both the consolidated parts order and the receipt on inclined rollers 64 which are connected to an outgoing conveyor 66. The label printer can be made to deliver a detailed statement as to the number, description, cost, and price of the parts.

Figure 6:
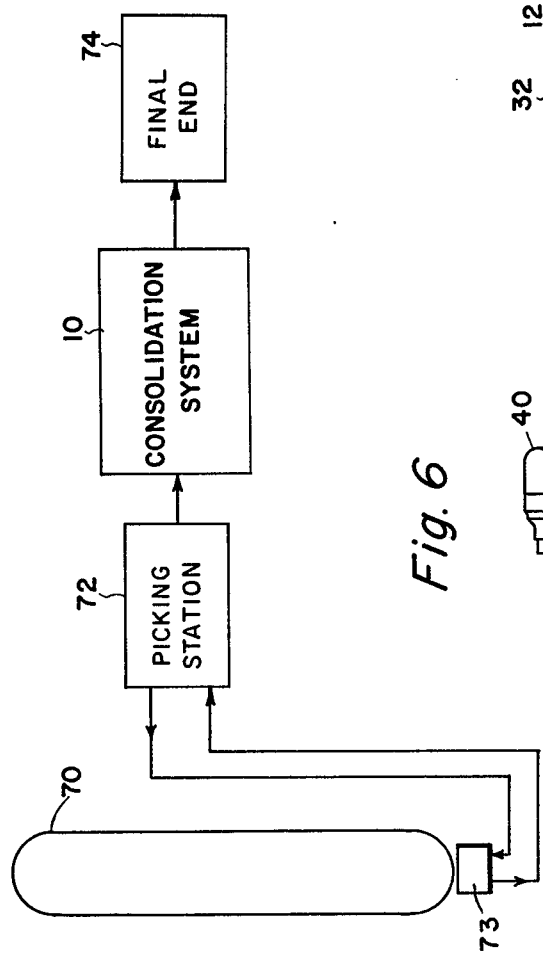
FIG. 6 is a flow-chart diagram of a storage and retrieval system utilizing the consolidation system shown in FIG. 1.

FIG. 6 shows a flow-chart having an article consolidation system utilized in combination with a storage and retrieval system. Parts and the like would be inserted and stored in a carousel 70 aligned adjacent to a picking station 72 containing an insertor and extractor mechanism 73. This extractor and insertor would deliver parts to the consolidation system 10 described in the present invention. The completed orders or kits would then be delivered to their usage or final destination 74.

Whereas, the present invention has been described in particular relation to the drawings attached hereto, it should be understood that other and further modifications of the invention, apart from those shown or suggested herein, may be made within the spirit and scope of this invention.

What is claimed is:

1. A consolidation system for consolidating preselected articles into predetermined combinations of articles which comprises a continuous track; a continuous chain supported from said track and movable in a horizontal direction around said track; a plurality of horizontally spaced and vertically extending baskets suspended from said chain, each basket having vertically spaced compartments; drive means for driving said chain around said track, said drive means including a sprocket engagable with said chain and a motor for driving said sprocket; an operator work station located at a fixed position on the outside of said track where an operator can perform predetermined work functions of introducing into said baskets said preselected articles and removing said predetermined combinations of articles from said baskets; alignment means for moving said chain a predetermined degree to align a preselected basket with said operator work station, said alignment means including a pulse generator adapted to emit pulses as said motor drives said chain, a sensor located at a fixed position adjacent said chain, an emitter mounted on said chain and adapted to activate said sensor once during each complete revolution of said chain; and indicating means located at said work station to indicate a predetermined vertical compartment on said preselected basket where a predetermined work function is to be performed.

2. A consolidation system for articles as set forth in claim 1 wherein said articles are stored in tote bins capable of being inserted within and removed from said vertically spaced compartments.

3. A consolidation system as set forth in claim 1 wherein said pulse generator includes a circular disc rotated by said motor and having a plurality of magnets serially mounted thereon, and magnetic sensors located at a fixed point relative to said disc for detecting changes in magnetic flux as said disc rotates.

4. A consolidation system as set forth in claim 1 wherein said indicating means includes a vertical ligh-tpost mounted at said work station and having a plurality of individual lights thereon and corresponding to the levels of said vertically spaced compartments.

* * * * *